UNITED STATES PATENT OFFICE.

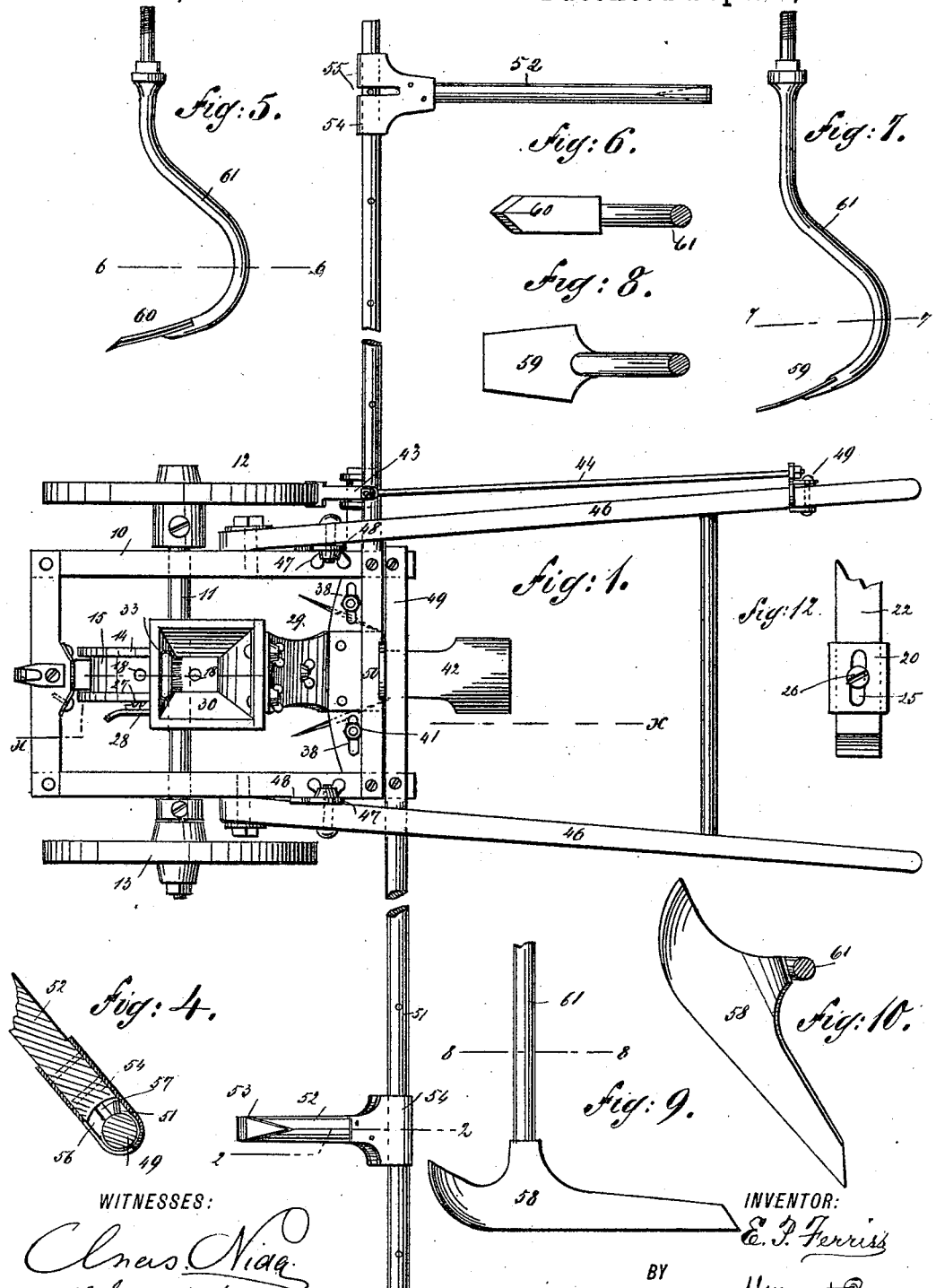

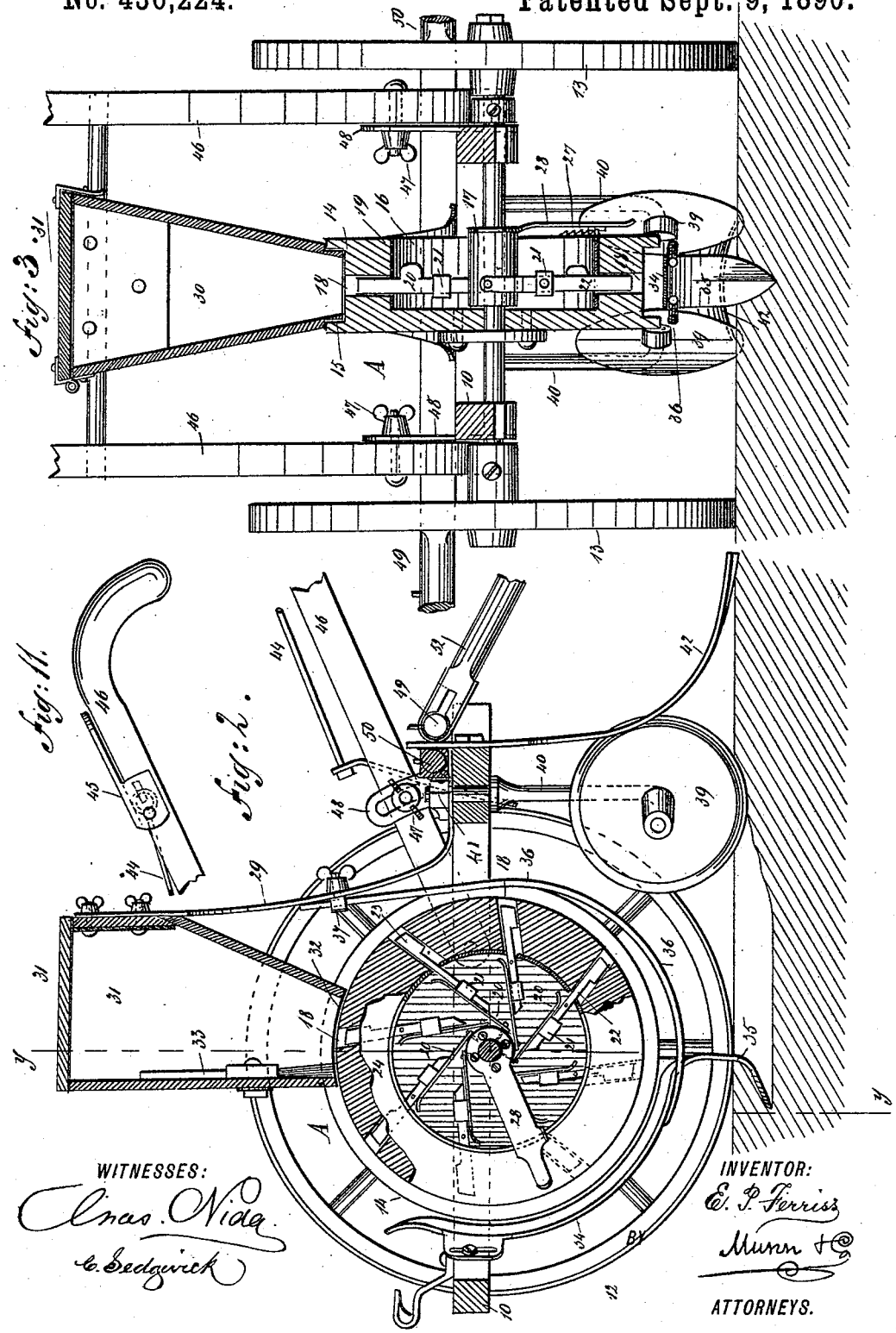

ELISHA P. FERRISS, OF STEVENS POINT, WISCONSIN, ASSIGNOR TO HIMSELF AND EMMONS BURR, OF SAME PLACE.

PLANTER.

SPECIFICATION forming part of Letters Patent No. 436,224, dated September 9, 1890.

Application filed July 30, 1889. Serial No. 319,179. (No model.)

*To all whom it may concern:*

Be it known that I, ELISHA P. FERRISS, of Stevens Point, in the county of Portage and State of Wisconsin, have invented a new and useful Improvement in Planters, of which the following is a full, clear, and exact description.

My invention relates to an improvement in planters, and has for its object to provide an implement capable of use as a planter and drill; and a further object of the invention is to provide an implement of simple and durable construction, to which a marker attachment may be applied, and also a hoe, scraper, and cultivator attachment, when found desirable.

The invention consists in the novel construction and combination of the several parts, as will be hereinafter fully set forth, and pointed out in the claims.

Reference is to be had to the accompanying drawings, forming a part of this specification, in which similar figures of reference indicate corresponding parts in all the views.

Figure 1 is a plan view of the implement, illustrating the marker attachment applied. Fig. 2 is a longitudinal section on line *x x* of Fig. 1. Fig. 3 is a transverse section on line *y y* of Fig. 2. Fig. 4 is a section on line 2 2 of Fig. 1. Fig. 5 is a side elevation of the cultivator attachment. Fig. 6 is a front elevation of the said attachment, the shank being sectioned on line 6 6 of Fig. 5. Fig. 7 is a side elevation of the hoe attachment. Fig. 8 is a front elevation of the same, the shank being sectioned on line 7 7 of Fig. 7. Figs. 9 and 10 are respectively a side elevation and a plan view of the scraper attachment, the shank in Fig. 10 being sectioned on line 8 8 of Fig. 9. Fig. 11 is a partial side elevation of one of the handles, illustrating the brake; and Fig. 12 is a rear elevation of one of the spring-arms and its extension or auxiliary arm detached from the implement.

In carrying out the invention the frame 10 is preferably made rectangular, and transversely in the frame a shaft 11 is journaled, the extremities of which shaft extend beyond the frame, and upon the outer ends of the shaft the drive-wheels 12 and 13 are mounted, the left-hand drive-wheel 13 being loosely mounted upon the shaft and the right-hand drive-wheel rigidly secured thereto.

At or near the center of the shaft 11 the seed-dropping mechanism A is secured, comprising a disk 14, provided with a peripheral groove 15 and an annular recess 16 in one side. This disk 14 is rigidly secured to the shaft, and within the recess 16 of the disk a sleeve 17 is loosely mounted upon the shaft, as illustrated in Figs. 2 and 3.

At or near the center of the peripheral groove 15 of the disk a series of apertures or openings 18 are formed, which extend through the disk into the recess 16. The side wall of the disk-recess 16 is preferably provided with a metal covering 19, which covering is apertured to register with the opening 18.

Upon the periphery of the sleeve 17 a series of metal arms 20 is rigidly secured, as shown in Fig. 2, the number of arms being made to correspond with the number of openings 18, and the said arms are so placed upon the sleeve that one arm will be located, essentially, in a plane with one side wall of an opening 18. The said arms 20 are preferably made of spring metal, each being provided at or near the center with an integral loop 21, and through the loop upon each arm 20 a second arm 22 is passed, which latter arms are preferably made of wood or metal and passed up through the apertures in the covering 19 of the disk-recess, one into each of the openings 18. The upper end of each of the extension-arms 22 is enlarged to snugly fit in the openings, and the said enlarged ends 23 are made to partake of the contour of the openings. The construction of these auxiliary or extension arms is clearly illustrated in Fig. 2. The outer extremities of the main or spring arms 20, attached to the sleeve, are preferably curved downward, and a series of apertures 24 is produced in the side of each of the auxiliary or extension arms, adapted to receive a pin, whereby the distance that the arms are made to extend upward in the openings 18 is regulated.

In the side face of each spring-arm 20, near the upper end, a longitudinal slot 25 is formed, through which slot a pin 26 extends integral with the contacting face of the auxiliary or extension arm 22, the slot 25 being of sufficient length to admit of the adjustment of the auxiliary or extension arm and serving, in connection with the pin 26, to regulate the movement of one arm upon the other.

The outer edge of the covering or casing 19 at one point in its circumference is provided with a series of teeth 27, forming a rack-surface adapted for engagement with a lug formed upon the inner face of a lever-arm 28, which lever-arm is fast to the outer end of the sleeve 17, carrying the spring-arms.

From the rear cross-bar of the frame a standard 29 is upwardly and slightly forwardly projected, and to the upper end of the said standard a seed-box 30 is adjustably attached, preferably by means of set-screws passing through the standard into the hopper, as shown in Fig. 2. The hopper is provided with a suitable cover 31 and an open reduced lower end, which is concaved, as illustrated at 32, the reduced lower end of the hopper being adapted to extend downward in the peripheral groove of the disk essentially to a contact with the latter, as best shown in Fig. 3. Within the hopper a brush 33 is attached to one side face, as shown in Fig. 2, which brush is adapted to remove any surplus grain from the disk as it revolves beneath the hopper after having received its charge.

To the center of the forward cross-bar of the frame one end of a spring throat-plate 34 is rigidly secured, which throat-plate extends downward beneath and concentric with the disk 14, terminating at a point beneath the axle or shaft 11, and to the forward end of the said throat-plate a tooth 35 is secured, which extends downward and at an inclination forward, as illustrated in Fig. 2, the said tooth being adapted to open the furrow in which the seed is to be planted, the seed being delivered from the throat-plate at the rear of the tooth. The width of the tooth 35 is regulated according to the width of the furrow to be opened.

In connection with the throat-plate 34 an adjusting-bar 36 is employed, having a bifurcated lower end, the members whereof are rigidly secured to the under surface of the throat-plate—one at each side of the tooth 35—and the upper end of the said adjusting-bar 36 is passed through a clamping-screw 37, attached to the standard 29, as best shown in Fig. 2, whereby the tooth 35 may be raised or lowered and thereby regulate the depth of the furrow.

The rear cross-bar of the frame 10 is provided with a slot 38 at each side of the center, whereby to facilitate the application of the several attachments to the machine.

When used as a planter and drill, two colters 39 are employed, pivoted upon the horizontal member of an angled shank or standard 40. Near the upper end of the vertical member of the angled colter shank or standard a collar is produced, and the upper end of the said standard or shank is passed through one of the slots 38 until the shoulder contacts with the under side of the frame, whereupon a lock-nut 41 is screwed upon the upper projecting end of the said standard, as illustrated in Figs. 1 and 2. The colters are placed at an angle to the rear cross-bar, and one is located at each side of the center of said cross-bar, as shown in Fig. 3, the colters being thus placed in order to throw the earth into the furrow to cover the seed as the implement is drawn forward. The earth covering the seed is not pressed to place by a roller or rollers, as has heretofore been the practice; but in lieu of said rollers I employ a rearwardly-curved drag-arm 42, the under face of which arm at the bottom is preferably concave, the upper end of the arm being adjustably secured to the rear edge of the rear cross-bar of the frame at the center thereof. Thus the drag-arm 42 is located between the colters 39.

As heretofore stated, the left-hand wheel is loose upon the axle or shaft 11, and the right-hand wheel, together with the seed-dropping mechanism, is fastened thereto. Thus as the right-hand wheel revolves the seed-dropping mechanism is operated. In order to stop the revolution of the right-hand wheel, and thereby cease the planting or dropping of the seed, I pivot a brake-shoe 43 upon a standard projected outward from one side of the frame, which shoe is operated by a rod 44, connected with a lever 45, pivoted upon the right-hand handle 46 of the implement, which lever is illustrated in detail in Fig. 11, being bifurcated at its pivotal point to embrace the sides of the handle. The handles 46 are pivotally attached one to each side beam of the frame, and their altitude is regulated by set-screws 47, passed through slotted standards 48, attached to the said side beams and forwardly curved.

In the operation of the implement as a planter and drill by removing the pins inserted in the apertures 24 of the auxiliary or extension arms 22 and bearing downward upon the lever-arm 28 the combined arms 20 and 22 may be drawn inward to any extent, and a pocket thereby formed in the upper ends of the openings 18 of the disk capable of receiving any predetermined number of seeds. When the arms have been adjusted, the pins are replaced in the apertures 24 to prevent the possibility of the position of the arms being changed by accident.

To plant the seed at intervals other than that illustrated in the drawings, any number of the auxiliary arms may be adjusted outward—every alternate arm, for instance—until their outer extremities are flush with the base-wall of the peripheral disk-groove 15. It will be observed that as the disk revolves the seed drops in proper quantities into the pockets, the brush removes the surplus, the throat-plate receives the seed from the disk, the tooth 35 makes the furrow to receive the seed when dropped from the throat-plate, the colters thereupon cover the seed, and the drag-bar presses the earth to place.

Upon the rear cross-bar of the frame the inner ends of two marker-arms 49 and 50 are secured, which extend outward in opposite directions at a right angle to the frame, as best shown in Fig. 1. Each arm is provided upon the upper face with a series of longitudinally-arranged spaced pins 51 and a finger 52, having a marking tooth or point 53 attached to the extremity. The fingers are pivoted to the arms by means of a strap-plate 54, attached to the upper end and passed around the arm, as shown in Fig. 4, each strap-plate having produced therein a longitudinal slot 55, through which one of the pins 51 projects, whereby the fingers are held against lateral movement a predetermined distance between the ends of the arms. The upper ends of the fingers are concaved to conform to the contour of the arms, which are circular, and provided at said end with a vertical slot 56 and an intersecting horizontal slot 57. Thus the fingers may be elevated to a perpendicular position above the arms, and when in this position may be slid to any point upon the same to receive the inner, the outer, or the intermediate pin, as required by the distance between the rows to be planted. It will be observed that one or both of the fingers may be held in the elevated position by causing a pin to contact with the walls of the horizontal slot only.

The drag-bar 42 may be removed, and also the colters 39, and the said colters may be replaced by scrapers 58 (shown in Figs. 9 and 10) when it is desired to remove the weeds from the top of the ground, or a hoe 59 (illustrated in Figs. 7 and 8) may be substituted, or a cultivator tooth or teeth 60, as illustrated in Figs. 5 and 6, each of these attachments being provided with a shank 61 of suitable shape, which shanks are formed in a similar manner to the shank or standard 40 of the colters, and is attached to the frame in like manner.

From the foregoing description it will be observed that any number of kernels may be planted in a hill that may be desired—for instance, from one to six—and that the implement will plant in hills once in three, six, nine, or twelve inches, for instance, or once in two or four feet, at the will of the operator. The plow, being placed directly under the axle or shaft, opens a furrow of equal depth, and the adjustability of the plow admits of a shallow or of a deep furrow being made, as occasion may demand, and as the earth is pressed upon the seed (not rolled, as heretofore) the lumps of earth are crushed and the seed is covered an equal depth.

Having thus described my invention, I claim as new and desire to secure by Letters Patent—

1. In a planter, the combination, with a shaft or axle having one drive-wheel loosely mounted thereon and the other fixedly secured thereto, of a disk secured upon the shaft or axle, provided with a peripheral groove and a recess in one side, a sleeve loosely mounted upon the axle or shaft within the disk-recess, a series of arms radially secured to the said sleeve, adapted to project outward through apertures in the disk, a hopper supported above the disk, and a lever-arm attached to the sleeve, capable of turning the same, substantially as shown and described.

2. In a planter, the combination, with a shaft or axle having one drive-wheel loosely mounted thereon and the other securely attached thereto, a disk rigidly secured upon the axle between the drive-wheels and provided with a peripheral groove and a recess in one side face, and a series of openings leading from the said recess into the said groove, of a sleeve loosely mounted upon the axle within the disk-recess, spring-arms radially attached to the said sleeve, auxiliary or extension arms attached to the spring-arms, one auxiliary arm being projected outward through each of the disk-openings, a lever-arm attached to the said sleeve, capable of revolving the same, and a seed-box supported above the disk, entering the groove therein, substantially as shown and described.

3. In a planter, the combination, with the shaft or axle having one drive-wheel loosely mounted thereon and the other rigidly secured thereto, a disk secured to the said axle between the drive-wheels, provided with a recess in one face, a peripheral groove and openings connecting the said recess and groove, a vertically-adjustable throat-plate concentrically held in front of the said disk, and a furrow-opener secured to the said throat-plate, of a sleeve loosely mounted upon the axle within the disk-recess, spring-arms radially secured to the said sleeve, and adjustable arms secured to the spring-arms, one arm projecting outward from each of the disk-openings, and a hopper supported above the disk capable of entering the peripheral groove therein, substantially as shown and described.

4. In a planter, the combination, with a shaft or axle having one drive-wheel loosely mounted thereon and the other securely attached thereto, a disk secured to the axle between the drive-wheels, provided with a recess in one face, a peripheral groove and openings connecting the said groove and recess, a sleeve loosely mounted upon the axle within the disk-recess, a lever-arm attached to the said sleeve, and a rack secured to the disk, capable of contact with the lever-arm, of a series of spring-arms radially secured to the sleeve, auxiliary arms adjustable upon the said spring-arms and adapted to enter one of each of the disk-openings, a vertically-adjustable throat-plate supported concentrically with the forward portion of the disk, a furrow-opener rigidly attached to the lower end of the throat-plate, and a seed-box supported above the disk, capable of entering the groove therein and provided with a sweep, substantially as shown and described.

5. In a planter, the combination, with a shaft or axle, of a seed-dropping mechanism comprising a disk secured to the said axle, provided with a recess in one side, a peripheral groove and openings connecting the said recess and groove, a sleeve loosely mounted upon the axle within the disk-recess, adjustable arms radially secured to the said sleeve, one arm projecting outward into each of the disk-openings, and a lever-arm attached to the said disk, adapted to rotate the sleeve, all combined for operation substantially as shown and described.

6. The combination, with a planter, of a marker attachment comprising arms secured to the rear of the frame and extending at a right angle therefrom in opposite directions, a series of pins longitudinally arranged upon the said arms, a finger carrying a marker at the lower extremity pivoted upon each of said arms by a strap attachment, the said strap being provided with a longitudinal slot capable of receiving a pin, and the finger within the strap with a horizontal and vertical recess, substantially as and for the purpose specified.

ELISHA P. FERRISS.

Witnesses:
JOHN MCCABE,
A. W. OTTO.